F. H. STANARD.
HUB FOR POSITIVELY DRIVEN STEERING WHEELS.
APPLICATION FILED MAR. 7, 1913.

1,103,702.

Patented July 14, 1914.
2 SHEETS—SHEET 1.

Witnesses
W. H. Mulligan.
V. B. Hillyard.

Inventor
Frank H. Stanard
By Victor J. Evans
Attorney

F. H. STANARD
HUB FOR POSITIVELY DRIVEN STEERING WHEELS
APPLICATION FILED MAR. 7, 1913.

1,103,702.

Patented July 14, 1914.

2 SHEETS—SHEET 2.

Witnesses
W. H. Mulligan
V. B. Hillyard

Inventor
Frank H. Stanard
By Victor J. Evans
Attorney

UNITED STATES PATENT OFFICE.

FRANK H. STANARD, OF DENVER, COLORADO, ASSIGNOR TO THE STANARD AUTOMOBILE MANUFACTURING COMPANY, OF DENVER, COLORADO, A CORPORATION OF COLORADO.

HUB FOR POSITIVELY-DRIVEN STEERING-WHEELS.

1,103,702.

Specification of Letters Patent. Patented July 14, 1914.

Application filed March 7, 1913. Serial No. 752,727.

*To all whom it may concern:*

Be it known that I, FRANK H. STANARD, a citizen of the United States, residing at Denver, in the county of Denver and State of Colorado, have invented new and useful Improvements in Hubs for Positively-Driven Steering-Wheels, of which the following is a specification.

The primary object of this invention is the provision of a hub and mountings for a positively driven steering wheel for vehicles which will admit of the use of a straight or integral axle and driving shaft in contradistinction to axles having steering knuckles and drive shafts provided with universal joints, with the result that the construction is materially simplified, the number of parts reduced to the fewest possible and the wheel and axle made durable without requiring an extra amount of material and a consequent bulky and cumbersome appearance.

An essential feature of the invention resides in a one piece axle and a continuous drive shaft, the wheel being mounted upon the axle in such a manner as to rotate freely thereon while at the same time being capable of turning to effect a proper steering of the vehicle or machine, the several parts being completely housed to prevent the entrance of dust or the waste of lubricant.

The invention consists of the novel features, details of construction and combination of parts, which hereinafter will be more particularly set forth, illustrated in the accompanying drawings, and pointed out in the appended claims.

Figure 1:
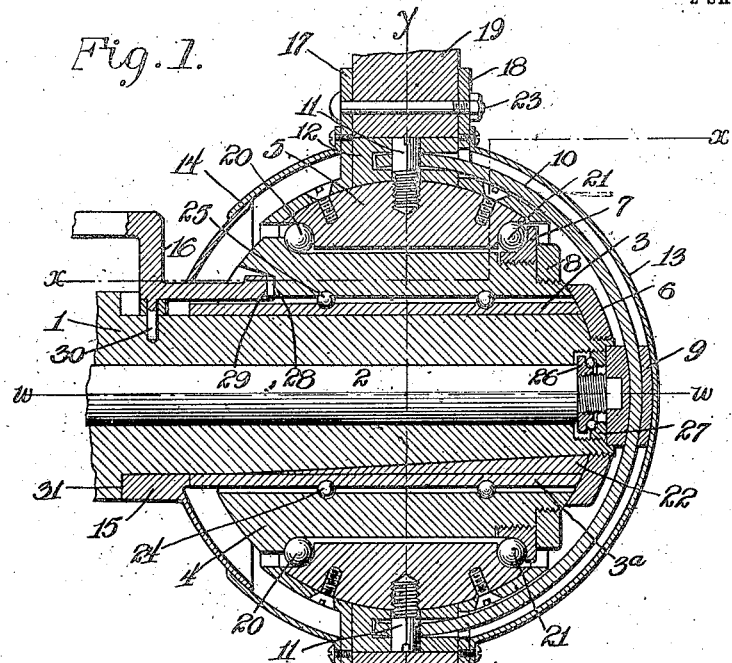
Figure 2:
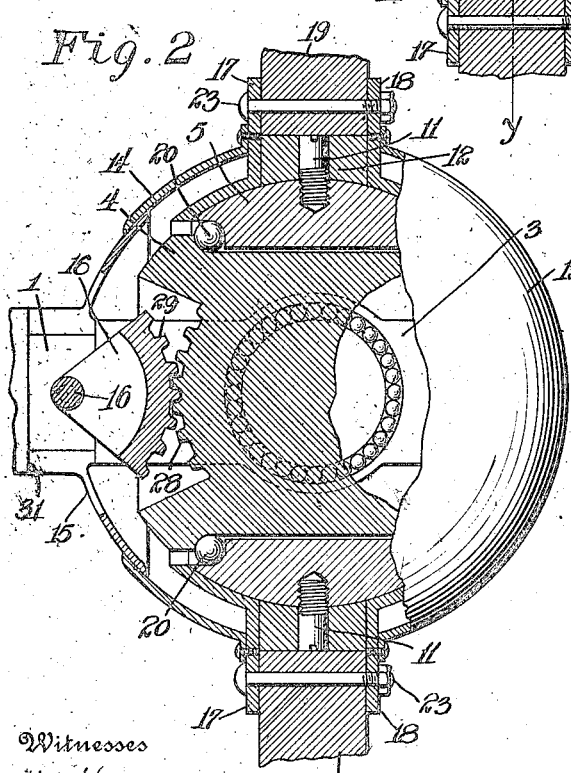
Figure 3:
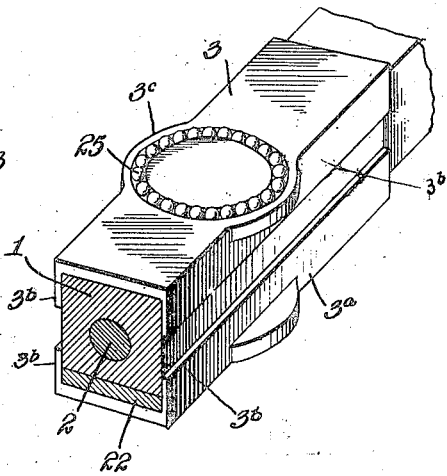
Figure 3:
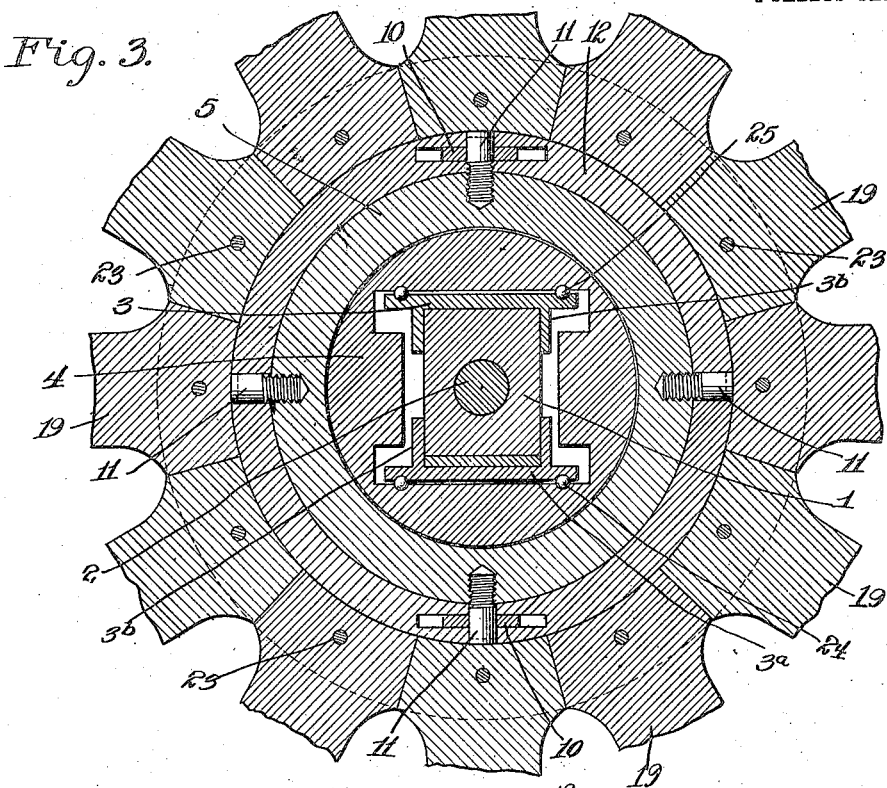
Figure 4:
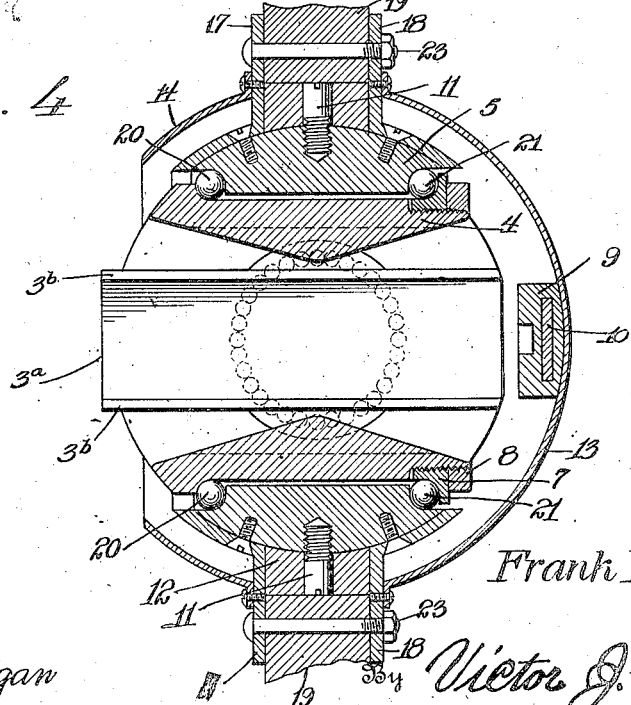

Referring to the drawings, forming a part of the specification, Figure 1 is a vertical central longitudinal section of the hub of a positively driven steering wheel for vehicles embodying the invention. Fig. 2 is a horizontal section on the line $x$—$x$ of Fig. 1. Fig. 3 is a vertical cross section of the hub on the line $y$—$y$ of Fig. 1. Fig. 4 is a horizontal section of the hub on the line $w$—$w$ of Fig. 1, the axle and driving shaft being omitted. Fig. 5 is a detail perspective view of the hub bearing and outer end of the axle.

Corresponding and like parts are referred to in the following description, and indicated in all the views of the drawing, by the same reference characters.

The axle 1 may be of any type and is rigid throughout its length, being free from the usual steering knuckles, such as generally provided for the front axle of automobiles and mechanically propelled vehicles. The ends of the axle designed to receive the hub bearings of the steering wheels are of non-circular cross section to prevent the turning of the hub bearings thereon. The axle is formed with a longitudinal opening to receive the driving shaft 2 by means of which power is transmitted to the hub of the steering wheel for imparting positive movement thereto.

The hub bearing comprises an upper part 3 and a lower part $3^a$, said parts being relatively adjustable to compensate for wear and to insure a close fit between the coöperating parts. The parts 3 and $3^a$ have flanges $3^b$ which embrace opposite sides of the axle, thereby preventing any turning of the hub bearing upon the axle. The middle portion of each of the parts 3 and $3^a$ is widened to form a substantially circular part $3^c$ in the outer edge portion of which is formed an annular groove to receive balls by means of which antifriction bearings are provided between the hub bearing and cone 4 upon which the hub of the steering wheel is directly mounted. The cone 4 has an opening to receive the hub bearing, said opening being flared toward opposite ends in a horizontal plane to admit of the cone having a limited turning movement about a vertical axis. The cone 4 is prevented from rotating about the hub bearing and the upper and lower walls adjacent the opening thereof are provided with annular grooves to match the annular grooves of the respective parts 3 and $3^a$ to form ball races in which balls 24 and 25 are placed. A close fit is provided for between the hub bearing and cone by the relative adjustment of the parts 3 and $3^a$ which is effected by means of a wedge 22 or other part, said wedge being inserted between the axle and one of the parts of the hub bearing. A nut 6 threaded upon the outer end of the axle engages the hub bearing and cone and retains such parts in place upon the axle. The cone 4 is provided at its inner end with a toothed portion 28 which is adapted to engage with the toothed portion 29 of a steering arm 16 which is fulcrumed upon a pin 30 set into the axle 1.

The hub 5 is mounted upon the cone 4 to rotate thereon and to turn therewith about a vertical axis. The bore or opening of the hub 5 is enlarged at its opposite ends to form annular shoulders which constitute parts of ball races in which are placed balls 20 and 21. The cone 4 has an annular shoulder near its inner end which, in conjunction with the annular shoulder at the inner end of the hub 5, receives the balls 20. A cone 7 is threaded upon the outer end of the cone 4 and confines the balls 20 between it and the outer annular shoulder of the hub 5. A lock nut 8 threaded upon the outer end of the cone 4 secures the cone 7 in the required adjusted position. The outer surface of the hub 5 is formed on the segment of a sphere. A band 12 is fitted centrally upon the hub 5 and is secured thereto by means of studs or pins 11. The hub flanges 17 and 18 are secured to end portions of the hub 5 and receive the inner ends of the spokes 19. Bolts 23 connect the outer members of the hub flanges and clamp the same against the sides of the band 12 and the inner ends of the spokes 19. A shield 15 is slipped upon the arm of the axle against the shoulder 31 formed at the inner end of such axle arm. A companion shield 14 is connected with the hub and overlaps the outer portion of the shield or guard 15. The shields or guards 14 and 15 are formed as segments or spheres so as to maintain a close joint and yet not interfere with the free rotation and angular adjustment of the wheel. A hub cap 13 is secured to the vertical member of the hub flange 18 and closes the outer portion of the hub.

The driving shaft 2 makes connection at its outer end with a head 9 in which is formed an arcuate opening to receive a semicircular yoke 10 which is connected at its ends to the band 12 at diametrically opposite points. Motion is transmitted to the wheel in any angular position by means of the head 9 and yoke 10. The ends of the yoke 10 pass through openings formed in the hub flange 18 and band 12 and are connected to the latter by opposite pins 11. The outer portion of the driving shaft is threaded and receives a cone 26 which engages the inner wall of a recess formed in the outer end of the axle 1. A cone 27 is threaded in the recess formed in the outer end of the axle and balls are placed between the two cones 26 and 27 to provide an anti-friction bearing between the outer end of the driving shaft and the axle.

The invention provides a rigid axle and driving shaft free from knuckles or joints while at the same time supporting a wheel which may be angularly adjusted for steering and at the same time positively rotated to assist materially in propelling the vehicle or machine, the hub and mountings being simple in construction and arrangement and capable of withstanding hard usage without requiring a mass of material in order to provide the requisite strength and as a consequence the hub is free from a cumbersome and bulky appearance. The angular adjustment of the wheel is effected by means of the steering arm 16 through the instrumentality of the segment gearing 28 and 29. The wheel may be easily removed from the axle after the hub cap 13 and nut 6 have been displaced by drawing the same outward in the usual manner, the construction being such as to admit of the wheel being easily and quickly slipped from the axle or upon the same. The head 9 is coupled to the outer end of the driving shaft 2 by means of a slip joint, the parts in engagement interlocking so as to insure transmission of movement from the driving shaft to the yoke 10 and from such yoke to the vehicle steering wheel.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In combination a rigid axle, a driving shaft mounted in the axle, a hub mounted upon the axle to rotate about the same and having a limited angular adjustment about a substantially vertical axis, a yoke pivotally connected with the hub and struck from a center coinciding with the axis about which the hub is adapted to be turned for angular adjustment, and a head having sliding connection with such yoke and adapted to be coupled to the driving shaft for rotation therewith.

2. In combination a rigid axle, a driving shaft mounted therein, a hub mounted upon the axle to rotate thereon and adapted to have a limited angular adjustment about a vertical axis, a yoke of approximately semicircular form pivotally connected at its ends with the hub at opposite points, and a head having sliding connection with such yoke and adapted to make detachable connection with the driving shaft.

3. In combination an axle, a driving shaft mounted therein, a hub mounted upon the axle to rotate thereon and adapted to have a limited angular adjustment about a vertical axis, a band connected centrally with the hub, a semicircular yoke having its end portions connected with such band, and a head slidable upon the yoke and making detachable connection with the driving shaft.

In testimony whereof I affix my signature in presence of two witnesses.

FRANK H. STANARD.

Witnesses:
O. N. PARSONS,
GEO. W. THORNBURGH.